United States Patent
Hsiao et al.

(10) Patent No.: US 8,634,167 B2
(45) Date of Patent: Jan. 21, 2014

(54) MAGNETIC HEAD WITH SELF COMPENSATING DUAL THERMAL FLY HEIGHT CONTROL

(75) Inventors: Wen-Chien D. Hsiao, San Jose, CA (US); Xinjiang Shen, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 253 days.

(21) Appl. No.: 13/117,814

(22) Filed: May 27, 2011

(65) Prior Publication Data

US 2012/0300334 A1    Nov. 29, 2012

(51) Int. Cl.
*G11B 5/127*    (2006.01)

(52) U.S. Cl.
USPC ............. 360/317; 360/125.31; 360/125.74

(58) Field of Classification Search
None
See application file for complete search history.

(56) References Cited

U.S. PATENT DOCUMENTS

| | | |
|---|---|---|
| 6,940,691 B2 | 9/2005 | Maat |
| 6,963,464 B2 | 11/2005 | Xu et al. |
| 7,068,468 B2 | 6/2006 | Kamijima |
| 7,190,543 B2 | 3/2007 | Suk |
| 7,372,665 B1 | 5/2008 | Stoev et al. |
| 7,400,473 B1 | 7/2008 | Krajnovich et al. |
| 7,525,765 B2 | 4/2009 | Kurita et al. |
| 7,595,960 B2 | 9/2009 | Shimizu et al. |
| 7,701,676 B2 | 4/2010 | Kubotera et al. |
| 2003/0174430 A1 | 9/2003 | Takahashi et al. |
| 2007/0247758 A1 | 10/2007 | Kurita et al. |
| 2008/0145709 A1 | 6/2008 | Yamashita et al. |
| 2008/0225427 A1 | 9/2008 | Liu |
| 2009/0251828 A1 | 10/2009 | Schreck et al. |
| 2009/0279204 A1 | 11/2009 | Jang |

FOREIGN PATENT DOCUMENTS

| | | |
|---|---|---|
| JP | 2006/351115 A | 12/2006 |
| JP | 2006/351116 A | 12/2006 |
| JP | 2008/165950 A | 7/2008 |
| JP | 2009/187595 A | 8/2009 |

*Primary Examiner* — Paul Huber
(74) *Attorney, Agent, or Firm* — Zilka-Kotab, PC

(57) ABSTRACT

A magnetic head for data recording having a pair of heating elements that self regulate in response to temperature to distribute heat for thermal actuation. The head includes a first heating element located adjacent to the read sensor and away from the writer, and a second heating element located adjacent to the writer. The first and second heating elements have different coefficients of thermal resistance that cause the heating of the second heating element to increase relative to that of the first heating element when the overall temperature increases or when power provided by a power source increases. There, thereby prevents the read sensor from extending too much and possibly contacting the disk.

13 Claims, 4 Drawing Sheets

MAGNETIC HEAD WITH SELF COMPENSATING DUAL THERMAL FLY HEIGHT CONTROL

FIELD OF THE INVENTION

The present invention relates to perpendicular magnetic write heads and more particularly to a head having a thermal fly height control system with dual heaters to adjust fly height control between the read sensor and the writer.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresistive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

One parameter that is of great importance to the performance of the magnetic data recording system is the fly-height of the head. As the slider flies over the disk, the spacing between the magnetic read/write head and the magnetic write layer of the magnetic media defines the fly height. The performance of the read and write heads increases exponentially with decreased fly height or more specifically with decreased magnetic spacing. However, the head should not actually contact the disk, since this can result in damage to the head and/or the disk. The fly height can be controlled to some extent by the design of the air bearing surface. To further reduce and control the fly height thermal actuators can be incorporated into a head to decrease the magnetic spacing through thermal expansion of the read and write head components.

SUMMARY OF THE INVENTION

The present invention provides a head for magnetic data recording that includes a magnetic read sensor, a magnetic writer, a first heating element located adjacent to the read sensor and removed from the magnetic writer; and a second heating element located adjacent to the writer. The first and second heating elements are configured such that the ratio of heat generation from the second heating element to heat generation by the first heating element increases with increasing temperature and heating power.

In one embodiment of the invention, the heating elements can be connected in series with one another, and the first heating element can be formed of a material having a lower Thermal Coefficient of Resistance (TCR) than the second heating element. When the system temperature increases or heating power increase, the resistance of the second heating element will increase much faster than that of the first heating element, causing the second heating element to generate more heat (and thermal expansion) than the first heating element. This prevents excessive thermal protrusion of the read sensor during high temperature conditions or high heating power and, thereby, prevents head/disk contact.

In another embodiment of the invention, the first and second heating elements can be connected in parallel with one another. In this case, the first heating element is constructed of a material having a higher Coefficient of Thermal Resistance (TCR) than the second heating element. In a high temperature environment or high heating power, the higher resistance of the first heating element causes more of the current to flow through the second heating element, thereby causing the second heating element to generate more heat relative to the first heating element. Again, this prevents excessive protrusion of the reader at high temperatures or high heating power, preventing the read sensor from contacting the disk.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
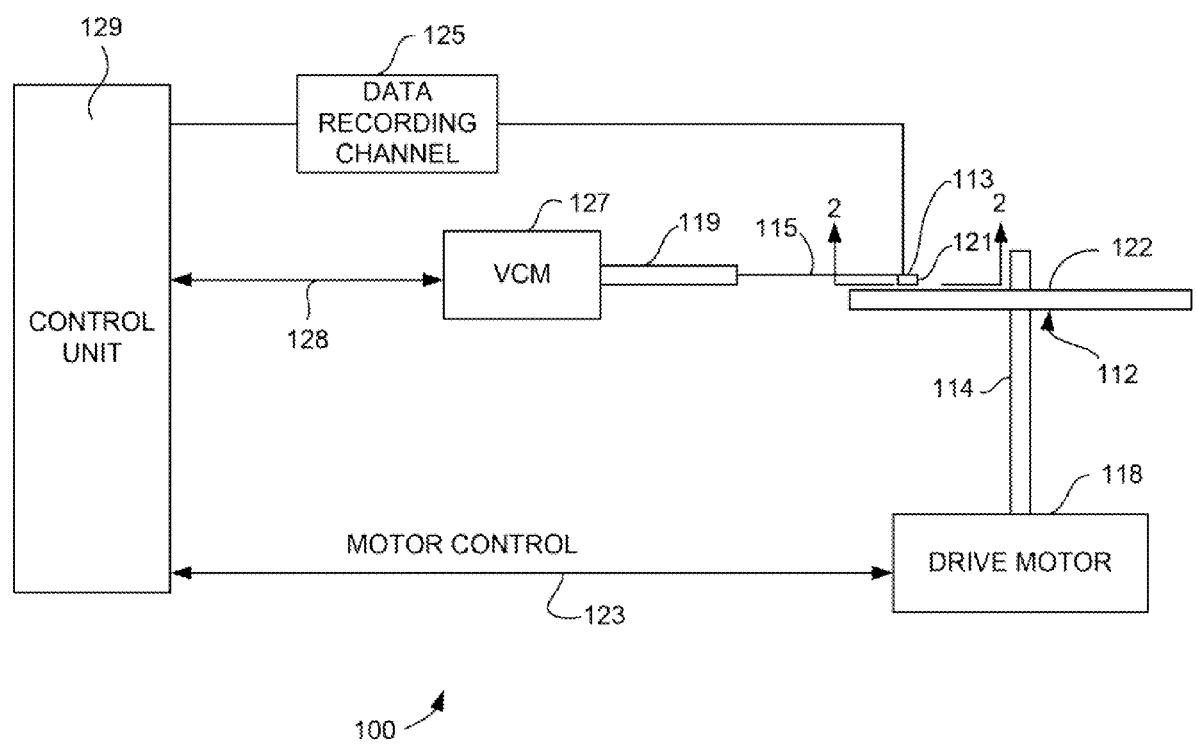
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
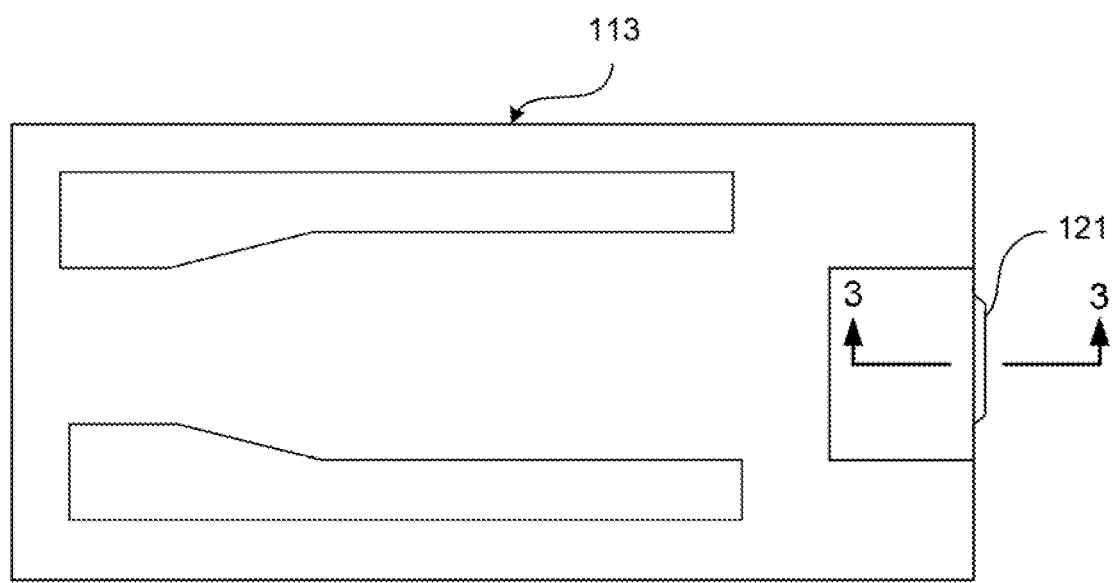
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
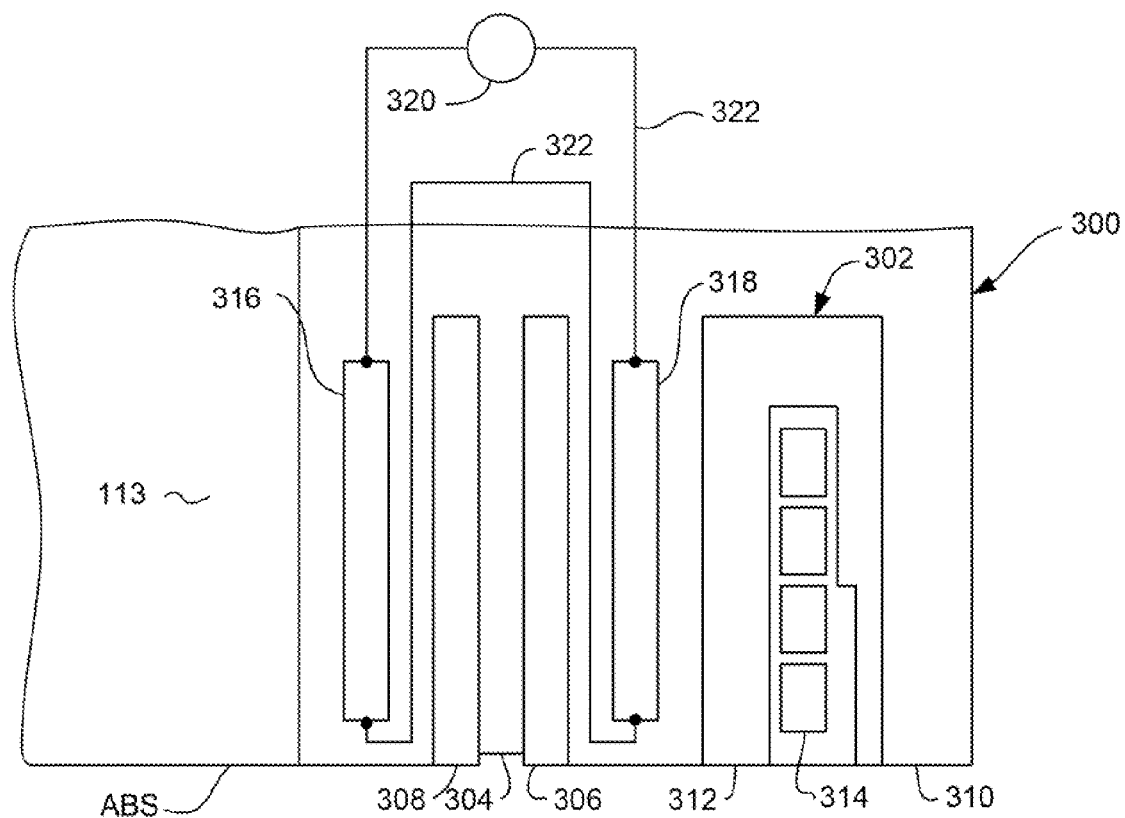
FIG. 3 is a cross sectional view of a portion of a magnetic head having self compensating dual thermal fly height actuators, according to an embodiment of the invention.

FIG. 3 shows an enlarged view of a portion of a magnetic head having a magnetic writer 302, and a magnet read sensor 304. The magnetic read sensor 304 is sandwiched between first and second magnetic shields 306, 308 that can be constructed of an electrically conductive material so that they function as electrical leads to conduct a sense current to the read sensor 304. The writer 302 can include a magnetic write pole 310, a magnetic return pole 312 and a non-magnetic, electrically conductive write coil 314. When current flows through the write coil 314, the resulting magnetic field induces a magnetic flux through the write pole 310 that produces a magnetic write field that emits from the tip of the write pole 310 to write a magnetic bit on an adjacent magnetic medium 112 (FIG. 1). This magnetic bit can later be read by the magnetoresistive sensor 304, which can be a tunnel junction magnetoresistive sensor (TMR) or a giant magnetoresistive sensor (GMR).

As discussed above, the distance between air bearing surface ABS and the adjacent magnetic media 112 (FIG. 1) is an important parameter for the performance of the head magnetic data recording system 100 (FIG. 1). The magnetic field from the magnetic media 112 drops off exponentially with increasing distance from the magnetized surface of the disk 112. Therefore, the closer the magetoresistive sensor 304 is to the media, the stronger the detected signal will be.

On the other hand, however, the sensor 304 should never actually make contact with the magnetic disk, as such contact can severely damage the sensor 304. Such damage could be in the form of, for example, abrasion or ablation (smearing) of the active layers of the sensor 304 as well as thermally induced permanent damage to the sensor 304. In order to prevent such contact between the sensor 304 and the disk 112, the sensor 304 can be slightly recessed from the ABS, as shown in FIG. 3.

Therefore, it can be seen that the performance of the head 300 and of the data recording system 100 (FIG. 1) depends to a large extent on maintaining a desired magnetic spacing between the head 300 and the magnetic media 112. The magnetic spacing should be as small as possible to maximize the strength of the signal being read by the sensor 304. On the other hand the magnetic spacing should be large enough to prevent contact between the sensor 304 and the media 112. One way to achieve this is through use of a thermal actuator. Such a thermal actuator locally heats the components of the head 300 such as the sensor 304, shields 306, 308 and writer 302. The thermal expansion of these components causes them to bulge outward toward the disk 112, thereby reducing the magnetic spacing to a distance that is just short of causing head/disk contact. In this way, a magnetic spacing of just a few nano-meters can be achieved.

However, a problem that can occur with the use of such thermal actuators is that the heater can cause too great an expansion of the sensor 304, thereby allowing the sensor 304 to protrude beyond the ABS and actually contact the disk. In some cases the sensor 304 can extend beyond the other elements of the head 300. This can especially occur in high ambient temperature environment, or when excessive power has been applied to the heater. In an effort to provide sufficient thermal expansion of the writer 302, the sensor 304 can actually protrude too much.

The present invention solves this problem by providing a system that automatically adjusts the distribution of heat within the system away from the sensor 304 in response to conditions such as high ambient temperature or high heating power. As shown in FIG. 3, the head 300 includes first and second heating elements 316, 318. The first heater 316 is preferably located adjacent to the sensor 304, between the sensor 304 (and shield 308) and the slider body 113. The second heater element 318 is preferably located closer to the trailing edge of the head 300, preferably between the sensor 304 (and shield 306) and the writer 302.

In the embodiment of FIG. 3, the heater elements 316, 318 are connected with a power source 320 that provides a current to the heaters 316, 318 to induce a resistive heating effect when the heaters 316, 318 are activated. As can be seen in FIG. 3, the heaters 316, 318 are connected in series with one another via leads 322. Both heaters 316, 318 are constructed of materials that have a high enough nominal resistance to cause the desired heating when an electrical current flows through them. However, the first heater element 316 is formed of a material having a lower Thermal Coefficient of Resistance (TCR) than the second heater element 318. This means that as the overall temperature increases, such as from higher ambient temperature or higher power from the power source 320, the electrical resistance of the second heater element 318 will increase faster than the first heater element 316. Because the two heaters 316, 318 are connected in series and experience an identical current flow, the greater increase in electrical resistance 318 will cause the second heater element 318 to generate more heat than the lower resistance heater element 316, based on Ohm's law wherein the heat power generated by resistive heating is equal to $I^2R$, where I is the current through the heaters 316, 318 and R is the resistance of each heater 316, 318. This allows the head 300 to experience a relatively greater thermal expansion closer to the writer 302 and a relatively smaller thermal expansion near the reader 304, thereby preventing the reader 304 from protruding excessively and/or contacting the media at elevated temperatures such as from high ambient temperature or high power from the power source 320.

In order to achieve this, the first heater 316 can be constructed of a relatively lower Thermal Coefficient of Resistance (lower TCR) material such as NiCr, and the second heater 318 can be constructed of a higher TCR material such as W. NiCr, for example, has a TCR of 0.024% per degree C., whereas W has a TCR of 0.43% per degree C. This means that at 30 degrees C. ambient temperature results 12% increase in electrical resistance for the second heater 318 relative to the first heater 316, as compared with an ambient temperature of 20 degrees C.

Therefore, in the read sensor 300, the read sensor 304 has a first thermal expansion TE1 and the write head 302 has a second thermal expansion TE2, and the ratio of TE1/TE2 decreases with increasing temperature or increased power to the heaters 316, 318. In other words, the read sensor 304 experiences less thermal expansion and less protrusion than does the write head 302 at higher temperatures or powers. This prevents the read sensor 304 from inadvertently contacting the media 112 (FIG. 1).

Figure 4:
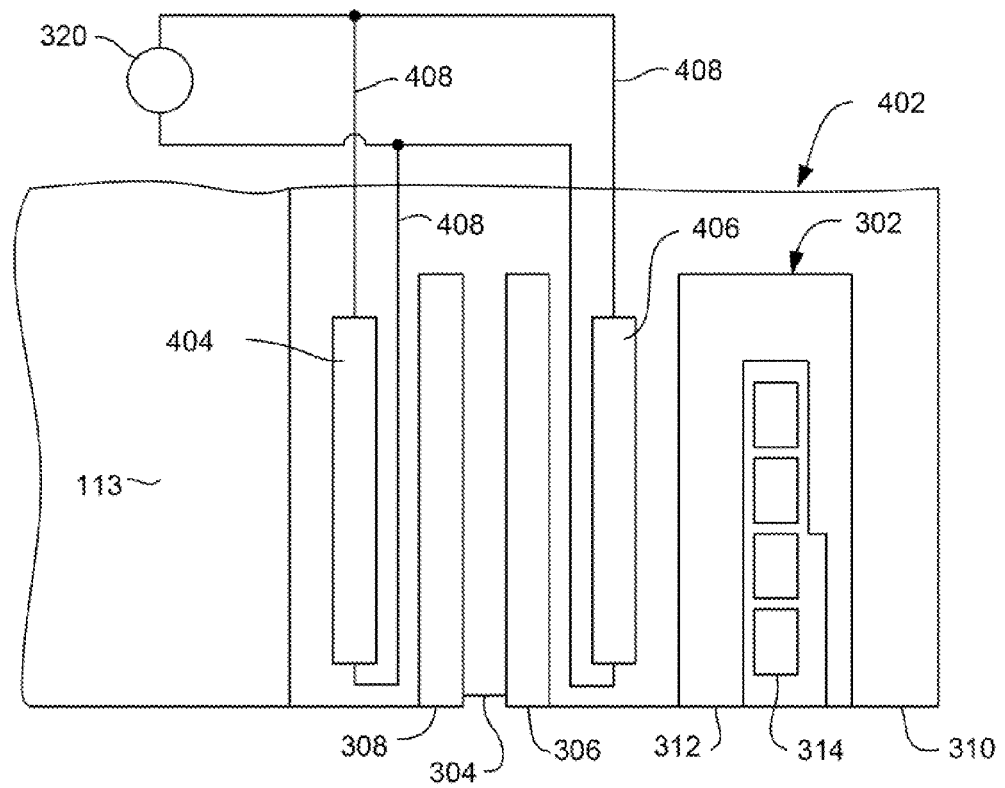
FIG. 4, is a cross sectional view of a portion of a magnetic head having self compensating dual thermal fly height actuators, according to another embodiment of the invention.

FIG. 4 shows a magnetic head 402 according to another embodiment. The head 402 has first and second heating elements 404, 406 that are connected in parallel with a power source 320 (rather than in series as described in FIG. 3). In this embodiment, the first heater element 404, located adjacent to the reader 304 and preferably between the reader 304 (and shield 308) and the slider body 113, is constructed of a material having a high thermal coefficient of resistance (TCR) such as NiCr. The second heater element 406 is located adjacent to the writer 302, preferably between the reader 304 (and shield 306) and the writer 302, and is constructed of a material having a low thermal coefficient of resistance (TCR) such as W.

In this case, since the first heater element 404 has a higher TCR than the second heater element 406, as the temperature increases the resistance of the first heater 404 increases faster than the resistance of the second heater 406, causing more current to flow through the second heater 406. Since as discussed above, the power generated by the current flow through each heater 404, 406 is $I^2R$, the increased current flow through the second heater 406 will cause the heating from the second heater 406 to increase and heating from the first heater 404 will actually decrease.

Using the thermal fly height control systems described above with reference to FIGS. 3 and 4, an optimal fly height can be maintained at a wide range of temperatures and power applications. The power ratio for the two heaters (316, 218 in FIG. 3 and 304, 306 in FIG. 4) (Rheater1/Rheater2) can be 1.0 at low power and can be automatically varied to 1.5 at high power. What's more, this ratio can be achieved automatically without any complex electronic circuitry that would otherwise consume valuable space on the head and would consume additional power from the data recording system. Using a system as described with reference to FIG. 4, a temperature increase of 20 degrees C. to 30 degrees C. would result in a the first sensor 404 experiencing a 3% decrease in power, while the second sensor 406 would experience a 3% increase in power. Similarly, 80 mW of power from the power source 320 would result in a 36% increase in resistance in the second heating element. The first heating element 404 would receive 8% less power while the second heating element 406 would receive 8% more power.

In either of the systems described above with reference to FIGS. 3 and 4, the first heating element 316 (FIG. 3) or 404 (FIG. 4) has a first power consumption P1 and the second heating element 318 (FIG. 3) or 406 (FIG. 4) has a second power consumption P2. The heating elements have a power ratio P2/P1 that is about 100% at low temperature or low power, and that is about 160% at high temperature or high power.

Therefore, similar to the structure described above with reference to FIG. 3, in the read head 402 the read sensor 304 has a first thermal expansion TE1 and the write head 302 has a second thermal expansion TE2, and the ratio of TE1/TE2 decreases with increasing temperature or increased power to the heaters 316, 318. Therefore, the read sensor 304 experiences less thermal expansion and less protrusion than does the write head 302 at higher temperatures or powers. Again, this prevents the read sensor 304 from inadvertently contacting the media 112 (FIG. 1).

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A head for magnetic data recording, comprising:
   a magnetic read sensor;
   a magnetic writer;
   a first heating element located adjacent to the read sensor and removed from the magnetic writer; and
   a second heating element located adjacent to the writer, wherein the first and second heating elements are configured to cause thermal expansion (TE1) of the read sensor and a thermal expansion (TE2) of the second heating element such that the ratio of TE1/TE2 decreases with increasing temperature.

2. The head as in claim 1 further comprising a power source connected with the first and second heating elements, and wherein the ratio TE2/TE2 decreases with increasing power from the power source.

3. The head as in claim 1 wherein the head is formed on a slider body, and wherein the first heating element is located between the magnetoresistive sensor and the slider body.

4. The head as in claim 1 wherein the first heating element has a different thermal coefficient of resistance than the second heating element.

5. The head as in claim 1 wherein the first heating element comprise NiCr and the second heating element comprises W.

6. The head as in claim 1 wherein the first heating element comprises W and the second heating element comprises NiCr.

7. A head for magnetic data recording, comprising:
a magnetic read sensor;
a magnetic writer;
a first heating element located adjacent to the magnetic reader and away from the magnetic writer;
a second heating element located adjacent to the magnetic writer; and power source;
wherein the first and second heating elements are connected with the power source in parallel, and the first heating element is constructed of a material having a higher thermal coefficient of resistance than the second heating element; and
wherein the first and second heating elements are configured to cause thermal expansion (TE1) of the read sensor and a thermal expansion (TE2) of the second heating element such that the ratio of TE1/TE2 decreases with increasing temperature.

8. The head as in claim 7 wherein the head is formed on a slider body, and wherein the first heating element is located between the read sensor and the slider body.

9. The head as in claim 7 wherein the first and second heating elements each have a thermal coefficient of resistance and wherein the thermal coefficient of resistance of the second heating element is lower than the thermal coefficient of resistance of the first heating element.

10. The head as in claim 7 wherein the head has an air bearing surface, and wherein each of the first and second heating elements is recessed from the air bearing surface by 3-8 micrometers.

11. The head as in claim 7 wherein the second heating element comprises NiCr and the first heating element comprises W, NiFe or Ta.

12. A head for magnetic data recording, comprising:
a magnetic read sensor;
a magnetic writer;
a first heating element located adjacent to the magnetic reader and away from the magnetic writer; and
a second heating element located adjacent to the magnetic writer; and power source;
wherein the first and second heating elements are connected with the power source in parallel, and the first heating element is constructed of a material having a higher thermal coefficient of resistance than the second heating element; and
wherein the first heating element has a first power consumption P1 and the second heating element has a second power consumption P2 and wherein the power ratio P2/P1 is about 100% at low power and about 160% at high power.

13. A head for magnetic data recording, comprising:
a magnetic read sensor;
a magnetic writer;
a first heating element located adjacent to the magnetic reader and away from the magnetic writer; and
a second heating element located adjacent to the magnetic writer; and power source;
wherein the first and second heating elements are connected with the power source in parallel, and the first heating element is constructed of a material having a higher thermal coefficient of resistance than the second heating element; and
wherein the first heating element has a first power consumption P1 and the second heating element has a second power consumption P2 and wherein the power ratio P2/P1 is about 100% at low temperature and about 160% at high temperature.

* * * * *